No. 746,616. PATENTED DEC. 8, 1903.
J. V. WASHBURNE.
SOCKET MEMBER.
APPLICATION FILED NOV. 12, 1902.
NO MODEL.
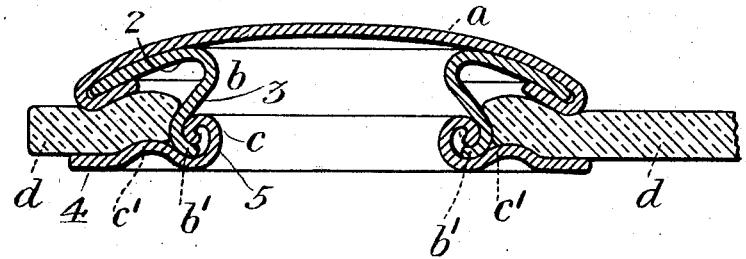
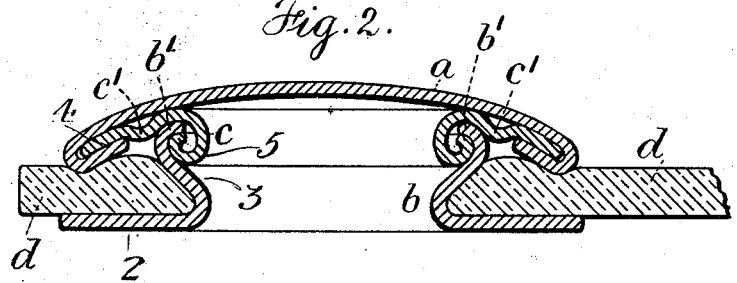
Witnesses:
J. Staib
Chas H Smith
Inventor:
James V. Washburne
per L. W. Serrell & Son
Attys No. 746,616. Patented December 8, 1903.

UNITED STATES PATENT OFFICE.

JAMES V. WASHBURNE, OF WATERBURY, CONNECTICUT.

SOCKET MEMBER.

SPECIFICATION forming part of Letters Patent No. 746,616, dated December 8, 1903.

Application filed November 12, 1902. Serial No. 130,948. (No model.)

*To all whom it may concern:*

Be it known that I, JAMES V. WASHBURNE, a citizen of the United States, residing at Waterbury, in the county of New Haven and State of Connecticut, have invented an Improvement in Socket Members, of which the following is a specification.

My invention relates to the well-known stud and socket members of a glove and garment fastener, the parts of which are adapted to be snapped into connection; and my invention relates particularly to the construction of the socket member adapted to receive the stud member of the fastener.

My invention consists in the combination, with a cap or cover, of an eyelet and socket part connected together and between which is the flexible material of a glove or garment, and one of which parts at its periphery is permanently connected to the cap or cover.

In the drawings, Figures 1 and 2 represent by vertical sections forms of my invention.

The cap $a$ is of curved or convex form, with the periphery overturned on the under side.

The eyelet $b$ comprises a flange 2 and an outwardly and inwardly curved wall 3.

The socket $c$ comprises a flange 4, a shoulder $c'$, and an outwardly-overturned wall or rib 5.

The flange 2 of the eyelet or the flange 4 of the socket part may be connected to the overturned periphery of the cap. In Fig. 1 the flange of the eyelet is connected to the cap, and in Fig. 2 the flange of the socket part is connected to the cap, the structures simply being reversed and in either relation operating satisfactorily as a socket member, flexible material $d$ in both instances being between the eyelet and the socket part in connecting the eyelet and the socket part. The advancing edge $b'$ of the eyelet is forced inwardly by pressure against the shoulder $c'$ of the socket part, and in so doing this edge of the eyelet is turned under the edge of the inwardly-rolled rib of the socket part, connecting the parts in an exceedingly firm and thorough manner. The periphery of either the eyelet or socket part is connected to the cap by overturning the periphery of the cap, and this is preferably done before the eyelet and socket parts are connected together with the flexible material intervening.

I claim as my invention—

1. The socket member of a snap-fastener, comprising a cap or cover having an overturned periphery, a socket part comprising a flange, an outwardly-rolled wall or rib and a shoulder portion outside of said wall, an eyelet comprising a flange and an outwardly and inwardly curved wall, the eyelet and socket part being connected together by the advancing edge of the eyelet forced inward by the shoulder of the socket part into connection with the wall of the socket part, and the flange of one of said parts connected to the cap with the flexible material intervening between the eyelet and socket parts.

2. In the socket member of a snap-fastener, a socket-piece having a flange, an annular shoulder and an outwardly-rolled wall bounding the open center, and a coacting part contacting with said shoulder and thereby turned toward said wall and into the recess between the shoulder and wall in securing the parts.

3. In the socket member of a snap-fastener, a socket-piece having a flange, an outwardly-rolled wall surrounding an open center and forming an annular recess, an annular rib or shoulder surrounding said wall, and an eyelet with walls adapted to come within said annular rib or shoulder, the advancing edge of which, when the parts are forced together under pressure, is by said rib or shoulder turned into said recess and within the grasp of the overturned wall in connecting said parts.

Signed by me this 5th day of November, 1902.

JAS. V. WASHBURNE.

Witnesses:
GEO. T. PINCKNEY,
S. T. HAVILAND.